(12) United States Patent
Caronni et al.

(10) Patent No.: US 7,778,970 B1
(45) Date of Patent: *Aug. 17, 2010

(54) METHOD AND SYSTEM FOR MANAGING INDEPENDENT OBJECT EVOLUTION

(75) Inventors: Germano Caronni, Menlo Park, CA (US); Raphael J. Rom, Palo Alto, CA (US); Glenn C. Scott, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 445 days.

This patent is subject to a terminal disclaimer.

(21) Appl. No.: 11/045,223

(22) Filed: Jan. 28, 2005

Related U.S. Application Data

(60) Provisional application No. 60/617,912, filed on Oct. 12, 2004.

(51) Int. Cl.
*G06F 7/00* (2006.01)
*G06F 17/00* (2006.01)
(52) U.S. Cl. .................................... 707/616
(58) Field of Classification Search ............... None
See application file for complete search history.

(56) References Cited

U.S. PATENT DOCUMENTS

| | | | |
|---|---|---|---|
| 5,640,564 A | 6/1997 | Hamilton et al. | |
| 5,761,511 A | 6/1998 | Gibbons et al. | |
| 5,907,837 A * | 5/1999 | Ferrel et al. | 707/3 |
| 6,629,203 B1 | 9/2003 | Humlicek | |
| 2002/0133491 A1 | 9/2002 | Sim et al. | |
| 2002/0174275 A1 | 11/2002 | Jay et al. | |
| 2003/0055805 A1* | 3/2003 | Gardner | 707/1 |
| 2005/0262097 A1* | 11/2005 | Sim-Tang et al. | 707/10 |
| 2006/0168154 A1* | 7/2006 | Zhang et al. | 709/220 |
| 2006/0179037 A1 | 8/2006 | Turner et al. | |
| 2007/0094312 A1* | 4/2007 | Sim-Tang | 707/204 |

OTHER PUBLICATIONS

A. Adya, et al.; "Farsite: Federated, Available, and Reliable Storage for an Incompletely Trusted Environment"; Proceedings of the 5th Symposium on Operating Systems and Design Implementation OSDI; Dec. 2002 (14 pages).

(Continued)

*Primary Examiner*—Neveen Abel Jalil
*Assistant Examiner*—Raheem Hoffler
(74) *Attorney, Agent, or Firm*—Osha • Liang LLP

(57) ABSTRACT

A method for managing object evolution in a distributed object store (DOS) involving requesting an update of an object, wherein the object includes an active globally unique identifier (AGUID) object and at least one version globally unique identifier (VGUID) object, wherein the at least one VGUID object includes a first generation number and a first serializer name, locating a first serializer using the first serializer name, wherein the first serializer is associated with the first generation number, obtaining an order of the update using the first serializer, and creating a new VGUID object, wherein the new VGUID object includes a new version number, the first generation number, and the first serializer name.

24 Claims, 7 Drawing Sheets

OTHER PUBLICATIONS

I. Clarke, et al.; "Freenet: A Distributed Anonymous Information Storage and Retrieval System"; Lecture Notes in Computer Science; 2000 (21 pages).

J. Kubiatowicz, et al.; "OceanStore: An Architecture for Global-Scale Persistent Storage"; Proceedings of ACM ASPLOS; Nov. 2000 (12 pages).

A. Rowstron, et al.; "Storage Management and Caching in PAST, a Large-Scale, Peristent Peer-to-Peer Storage Utility"; Symposium on Operating Systems Principles; Oct. 2001 (13 pages).

S. Quinlan, et al.; "Venti: A New Approach to Archival Storage"; Proceedings of the FAST 2002 Conference on File and Storage Technologies; First USENIX Conference on File and Storage Technologies; Jan. 2002 (14 pages).

A. Muthitacharoen, et al.; "Ivy: A Read/Write Peer-to-Peer File System"; Proceedings of the $5^{th}$ USENIX Symposium on Operating Systems Design and Implementation (OSDI '02); Dec. 2002 (23 pages).

F. Dabek, et al.; "Towards a Common API for Structured Peer-to-Peer Overlays"; Proceedings of $2^{nd}$ International Workshop on Peer-to-Peer Systems (IPTPS '03), Feb. 2003 (11 pages).

I. Stoica, et al.; "Chord: A Scalable Peer-to-Peer Lookup Service for Internet Applications"; Proceedings of the SISCOMM 2001 Conference on Applications, Technologies, Architectures, and Protocols for Computer Communications; Aug. 2001 (12 pages).

B. Zhao, et al.; "Tapestry: A Resilient Global-Scale Overlay for Service Deployment"; IEEE Journal on Selected Areas in Communications; Jan. 2004 (15 pages).

A. Rowstron, et al.; "Pastry: Scalable, Decentralized Object Location and Routing for Large-Scale Peer-to-Peer Systems"; Lecture Notes in Computer Science; 2001 (22 pages).

C. Greg Plaxton, et al.; "Accessing Nearby Copies of Replicated Objects in a Distributed Environment"; ACM Symposium on Parallel Algorithms and Architectures; Jun. 1997 (23 pages).

M. Castro, et al.; "Practical Byzantine Fault Tolerance"; Symposium on Operating Systems Design and Implementation; Feb. 1999 (14 pages).

D. B. Terry, et al.; "Managing Update Conflicts in Bayou, a Weakly Connected Replicated Storage System"; Proceedings of the Fifteenth ACM Symposium on Operating Systems Principles; Dec. 1995 (12 pages).

D. Boneh, et al.; "Efficient Generation of Shared RSA Keys"; Journal of the ACM; 2001 (21 pages).

Y. Frankel, et al.; "Robust Efficient Distributed RSA-Key Generation"; Proc. $30^{th}$ Annual ACM Symposium on Theory of Computing (STOC); May 1998 (10 pages).

\* cited by examiner

METHOD AND SYSTEM FOR MANAGING INDEPENDENT OBJECT EVOLUTION

CROSS-REFERENCE TO RELATED APPLICATIONS

This application claims benefit under 35 U.S.C. §119(e) from Provisional Application No. 60/617,912 entitled "Maintaining Object Ordering in a Shared P2P Storage Environment" filed on Oct. 12, 2004.

BACKGROUND

In recent years, a number of distributed storage system have been developed, commonly in the context of peer-to-peer (P2P) systems. The first generation of such P2P systems, e.g., Napster, Gnutella, etc., were "read-only" systems suitable for file sharing. These first generation systems typically placed less emphasis on availability and reliability of data and more emphasis on connectivity and name management (i.e., organization of files in directories, search mechanisms, etc.).

Modern P2P storage systems have evolved to provide solutions to a variety of storage problems. For example, recent approaches to P2P storage systems provide more extensive security, file sharing, and archive capabilities. Modern P2P storage systems are typically classified as archival-only systems or continuous-update systems. Archival-only systems (e.g., Venti, Freenet, etc.) assume that each object (e.g., piece of data, group of data, etc.) stored by the P2P storage system is unique and not dependent on any other object stored in the system. The archival-only systems typically provide mechanisms to reliably and securely store and retrieve objects. Further, archival-only systems are typically designed to work properly under disrupted or intermittent connectivity as long as unique object names can be created, new objects can be created and stored, and all objects can be retrieved subject to the connectivity constraints.

On the other hand, continuous-update systems (e.g., Oceanstore, FarSite, etc.) provide the ability to handle shared write operations and to maintain some relation between stored objects, in addition to the functionalities provided by archival-only systems. Further, continuous-update systems typically assume that data (in the form of objects) stored in the system may be updateable. Continuous-update systems typically maintain "the latest version" of an object. In this case, because object updates may originate simultaneously from multiple sources, a continuous-update system includes functionality to implement a serializer function. The serializer function is responsible for enforcing strict ordering of updates and may be implemented in many ways, for example, a centralized serializer, a distributed serializer, etc. Typically, continuous-update systems that support shared writes require additional mechanisms to maintain data integrity under intermittent connectivity.

Both archival-only and continuous-update systems rely on a distributed object location and retrieval (DOLR) mechanism (e.g., Tapestry [see, for example, Tapestry: An Infrastructure for Fault-tolerant Wide-area Location and Routing (2001)], Chord, etc.). Systems which use DOLR implement an overlay network on top of the basic Internet Protocol network, and use a naming and routing scheme, typically distributed hash tables (DHT), to communicate. Systems employing the DOLR mechanism are typically very sensitive to the availability and connectivity of the underlying communication infrastructure. In some cases, failures of critical devices (e.g., nodes, the serializer, etc.) and physical storage that is occasionally disconnected from the network may not allow systems using the DOLR mechanism to operate correctly (i.e., provide access to objects).

SUMMARY

In general, in one aspect, the invention relates to a method for managing object evolution in a distributed object store (DOS) comprising requesting an update of an object, wherein the object comprises an active globally unique identifier (AGUID) object and at least one version globally unique identifier (VGUID) object, wherein the at least one VGUID object comprises a first generation number and a first serializer name, locating a first serializer using the first serializer name, wherein the first serializer is associated with the first generation number, obtaining an order of the update using the first serializer, and creating a new VGUID object, wherein the new VGUID object comprises a new version number, the first generation number, and the first serializer name.

In general, in one aspect, the invention relates to a system, comprising an object comprising an AGUID object and at least one VGUID object, wherein the object is configured to be updated with a new VGUID object, a plurality of nodes configured to store the object, and a first serializer configured to determine an order of the new VGUID object, wherein the first serializer is associated with a first generation number, and wherein the new VGUID object comprises the first generation number.

In general, in one aspect, the invention relates to a computer readable medium for managing object evolution in a distributed object store (DOS) comprising software instructions to request an update of an object, wherein the object comprises an active globally unique identifier (AGUID) object and at least one version globally unique identifier (VGUID) object, wherein the least one VGUID object comprises a first generation number and a first serializer name, locate a first serializer using the first serializer name, wherein the first serializer is associated with the first generation number, obtain an order of the update using the first serializer, and create a new VGUID object, wherein the new VGUID object comprises a new version number, the first generation number, and the first serializer name.

Other aspects of the invention will be apparent from the following description and the appended claims.

DETAILED DESCRIPTION

Figure 1:
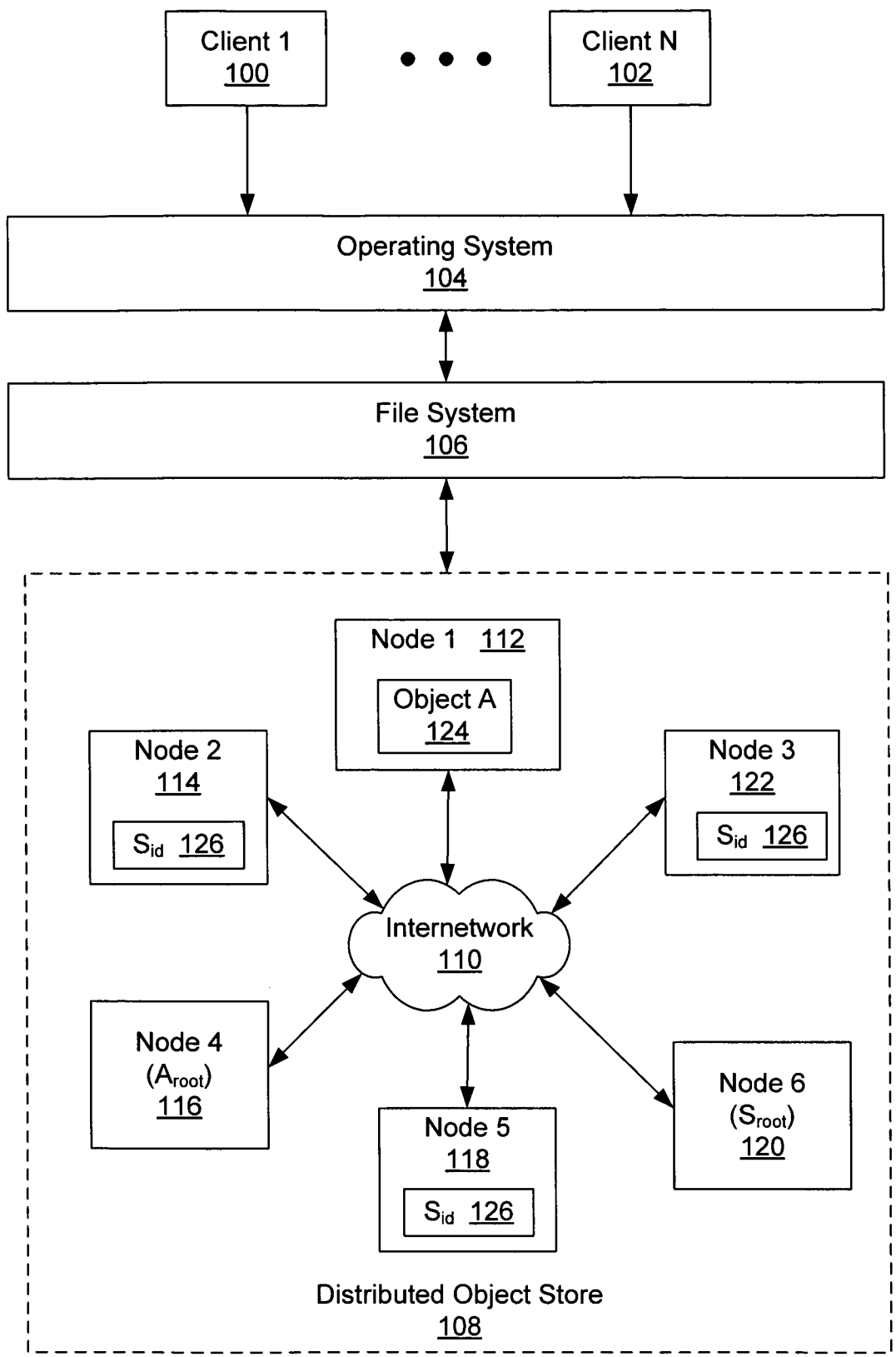
FIG. 1 shows a system in accordance with one embodiment of the invention.

Exemplary embodiments of the invention will be described with reference to the accompanying drawings. Like elements in the various figures are denoted by like reference numerals for consistency. Further, the use of "ST" in the drawings is equivalent to the use of "Step" in the detailed description below.

In the following detailed description of the invention, numerous specific details are set forth in order to provide a more thorough understanding of the invention. In other instances, well-known features have not been described in detail to avoid obscuring the invention.

In general, embodiments of the invention relate to a distributed object storage system. Specifically, embodiments of the invention relate to managing independent object evolution in a distributed object storage system. Further, embodiments of the invention relate to managing independent object evolution in a partitioned distributed object storage system and merging independent object evolutions when partitions of the distributed object storage system reunite. Further, embodiments of the invention relate to using a serializer to provide a globally coherent view of object evolutions in both partitioned and united distributed object storage systems.

FIG. 1 shows a system in accordance with one embodiment of the invention. The system includes one or more clients (i.e., Client 1 (100), Client N (102)) operatively connected to an operating system (104). The operating system (104) in turn is operatively connected to a file system (106), which is operatively connected to a distributed object store (DOS) (108). The operating system (104) typically provides clients (100, 102) with interfaces for opening, closing, editing, etc., files stored in the file system (106). The files, stored in the file system (106), contain data that is stored in the form of objects in the DOS (108). In one embodiment of the invention, an object is a collection of data that is capable of being modified (i.e., updated) and read by clients (e.g., Client 1 (100), Client N (102)) (as described in FIG. 2 below).

In one embodiment of the invention, the file system (106) includes functionality to resolve file names associated with the file system (106) to object identifiers (i.e., globally unique identifiers (GUIDs)) associated with objects stored in the DOS (108). In addition to associating objects with GUIDs, in one embodiment of the invention, other elements (e.g., nodes, etc.) within the DOS (108) are identified using a GUID. In one embodiment of the invention, the GUID is a location independent handle that is used to reference individual elements within the DOS (108). In one embodiment of the invention, all GUIDs for elements within the DOS (108) are obtained from the same namespace. In one embodiment of the invention, the GUID may be generated using a hash of the public key and the file name corresponding to the entity for which a GUID is being assigned. GUIDs are communicated by the file system (106) to the DOS (108) via an interface.

In one embodiment of the invention, GUIDs communicated to the DOS (108) are subsequently used to call lower-level interfaces that retrieve elements corresponding to the GUID. In this manner, a client's (e.g., Client 1 (100), Client N (102)) request (including a file name) may be serviced by the DOS (108) using a GUID to locate and provide access to an object containing the data requested by the client (e.g., Client 1 (100), Client N (102)). In one embodiment of the invention, the interface between the file system (106) and the DOS (108) allows simple commands to be communicated, such as a command to retrieve a file, update a file, delete a file, etc.

In one embodiment of the invention, the DOS (108) is a mutable object store (i.e., the DOS (108) includes read and write capabilities) with storage capacity (e.g., physical disks, etc.) and multiple nodes (e.g., Node 1 (112), Node 2 (114), Node 3 (122), Node 4 (116), Node 5 (118), Node 6 (120)), where each node (e.g., Node 1 (112), Node 2 (114), Node 3 (122), Node 4 (116), Node 5 (118), Node 6 (120)) may also include its own local storage capacity. Further, some nodes within the DOS (108) may be used for object storage, while other nodes may be used for message passing, management, etc. For example, Node 1 (112) in FIG. 1 is shown as storing object A (124), where object A (124) is identified by the GUID $A_{obj}$ (not shown). Further, all the nodes (e.g., Node 1 (112), Node 2 (114), Node 3 (122), Node 4 (116), Node 5 (118), Node 6 (120)) in the DOS communicate using a inter-network (110). In one embodiment of the invention, the inter-network (110) of the DOS (108) is organized using distributed hash tables (DHT). DHT provides the information look-up service for the DOS. Thus, communication and routing of messages, objects, update requests, etc. between nodes within the DOS (108) is handled using DHT. Further, each node in the DOS (108) is capable of locating and retrieving objects via their respective GUIDs.

Figure 2:
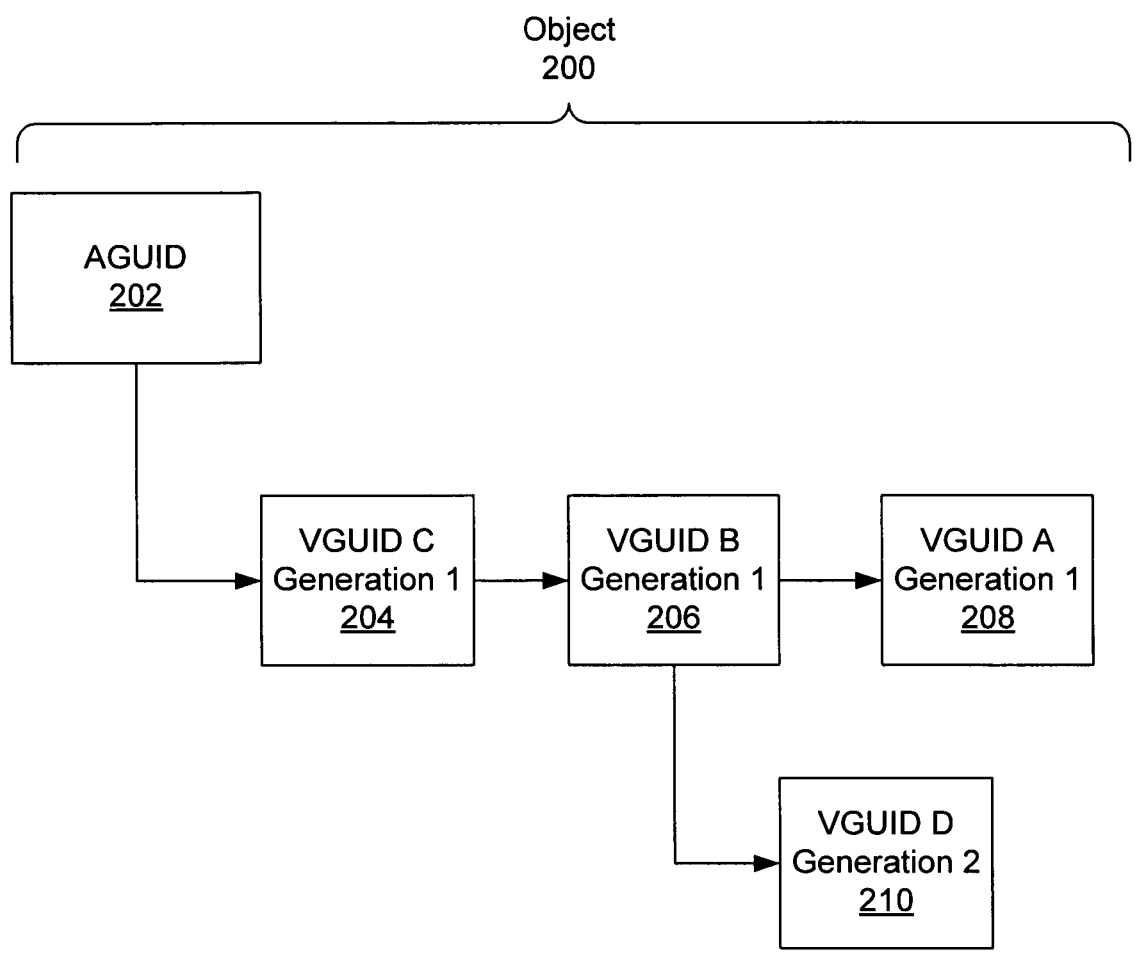
FIG. 2 shows an object in accordance with one embodiment of the invention.

As described above, the DOS (108) stores data in the form of objects. FIG. 2 shows an object (200) in accordance with one embodiment of the invention. As defined in the present invention, the object (200) is actually made up of a group of objects. Specifically, in one embodiment of the invention, an object includes an active GUID (AGUID) object and one or more version GUID (VGUID) objects. The AGUID object is used to identify the object as a whole (including updates), and each VGUID object represents a particular version (i.e., an update) of the object (200). In one embodiment of the invention, the AGUID object contains the name of the object, and is identified using the GUID of the object. Further, in one embodiment of the invention, as an object is updated, the content of the AGUID object associated with the object is modified to reference the new VGUID object that is added to the object as a result of the update made to the object. In contrast, the content of the previous latest VGUID object (i.e., the previous "latest version" of the object) is not modified when an object is updated. Rather, the new VGUID object references the previous VGUID object.

In contrast, a particular VGUID object associated with an object has its own GUID that is different from the GUID of the object. To illustrate the relationship between an object, an AGUID object, and one or more VGUID objects, consider the object (200) shown in FIG. 2. The object (200) includes an AGUID object (202), and several VGUID objects (i.e., VGUID A (208), VGUID B (206), VGUID C (204)). Initially, when the object is created, the data stored in the object is stored in a VGUID object, and an AGUID object is created to reference the VGUID object and provide metadata associated with the object. For example, using the object (200) shown in FIG. 2, storing data in the DOS initiates the creation of the AGUID object (202) and one VGUID object (i.e., VGUID C (204)). In one embodiment of the invention, the AGUID object (202) includes information regarding the serializer (discussed below) associated with the object (200), the GUID of the object (200), a pointer to the most recent VGUID object, and other metadata associated with the object (200), such as version numbers and generation numbers (discussed below).

Upon creation of the object (200), the object (200) may be updated at various times by clients using the DOS. In one embodiment of the invention, each new version of the object (200) is identified by its own VGUID object (i.e., VGUID A (208), VGUID B (206), VGUID C (204)). More specifically, as the object (200) is updated, additional VGUID objects (i.e., VGUID A (208), VGUID B (206), VGUID C (204)) are created and added to the object (200). In one embodiment of the invention, each new VGUID object (i.e., VGUID A (208), VGUID B (206), VGUID C (204)) is linked to previous VGUID object(s) (i.e., VGUID A (208), VGUID B (206), VGUID C (204)) of the object (200) using back pointers, forming a chain of versions of the object (200). Specifically, each VGUID object includes two back pointers, i.e., one that references the latest previous VGUID object, and one that references the VGUID object upon which the update to the object is based. The most recent VGUID object (i.e., VGUID A (208) in FIG. 2) added to the chain represents the "latest version" of the object (200), and includes the most recent updates made to the object (200). Further, each VGUID object (i.e., VGUID A (208), VGUID B (206), VGUID C (204)) includes a pointer to a data structure (not shown) through which the data of that version of the object (200) may be retrieved.

In one embodiment of the invention, each VGUID object (i.e., VGUID A (208), VGUID B (206), VGUID C (204)) includes information such as the version number for that particular version of the object (200), the previous version number associated with the previous VGUID object, the identity of the updating node, signatures and keying material, information identifying the AGUID object (202), etc. In one embodiment of the invention, each VGUID object (i.e., VGUID A (208), VGUID B (206), VGUID C (204)) also includes a generation number corresponding to the serializer (discussed below) associated with the object (200).

Continuing with FIG. 2, in one embodiment of the invention, the first version (i.e., the first VGUID object created) of a new generation of an object (200) is linked to some version of a previous generation from which it follows. As shown in FIG. 2, VGUID D (210) of generation two is linked to VGUID B (206) of generation one. In one embodiment of the invention, the presence of different generation numbers associated with VGUID objects indicates that a partition in the DOS occurred, and independent object evolutions of the object (200) are maintained in each partition. In one embodiment of the invention, although VGUID B (206) and VGUID D (210) are different VGUID objects, the same version number may be assigned to each, where different generation numbers distinguish the different VGUID objects with the same version number. In one embodiment of the invention, the chain of VGUID objects are linked in a manner that allows any previous VGUID object in any previous or current generation to be obtained. Those skilled in the art will appreciate that version numbers assigned to VGUID objects may increase monotonically across generations or be reset for each new generation number.

Those skilled in the art will appreciate that the use of the term "object" throughout this application refers to an object such as that depicted using reference number 200 in FIG. 2. Specifically, the term "object" refers to the entire chain of the object, including the AGUID object, one or more VGUID objects, and the actual data contained in the object.

Returning to FIG. 1, in one embodiment of the invention, for any object in the DOS (108), a root node associated with the object exists. The root node of the object is responsible for tracking the location of the object at all times. FIG. 1 shows the root node of object A (124) as Node 4 (116), where Node 4 (116) is denoted as $A_{root}$ (i.e., the root of object A (124)) for purposes of illustration. Thus, Node 4 (116) is responsible for maintaining information regarding the location of object A (124) and providing requesting nodes with the address of one or more nodes that store object A (124). In one embodiment of the invention, if the root node of an object fails, is disconnected from the internetwork (110), or is otherwise unable to function, another node within the DOS (108) automatically becomes the root node for the object. The assigning of root nodes is implemented based on the GUID of the object and the GUIDs of nodes actively operating in the DOS (108). Specifically, the node that has a GUID that is closest to the GUID of the object (i.e., closest lower in namespace to the GUID of the object) is assigned as the root node of the object. For example, if an object's GUID is 1000, then a node with a lower GUID in closest proximity to 1000, for example 900, is assigned the root node of the object. Thus, if the root node of an object fails or is somehow disconnected from the internetwork (110), a new node, which has a GUID that is closest to the GUID of the object, is assigned as the root node of the object.

Further, in one embodiment of the invention, each object (i.e., each composite object represented by the AGUID object) is associated with a serializer. In one embodiment of the invention, the serializer is a function that is responsible for ordering the updates made to an object and assigning a version number to each VGUID object added to an object. In one embodiment of the invention, the serializer is made up of multiple nodes, each of which include the same serializer object associated with the particular serializer. Similar to other elements in the DOS, the serializer object is identified using a GUID. The GUID associated with a given serializer object is stored in each serializer object associated with the particular serializer. Thus, for a given serializer, each node that is part of the serializer (i.e., a member of the serializer) includes the same serializer object. As shown in FIG. 1, Node 2 (114), Node 3 (122), and Node 5 (118) each include the serializer object $S_{id}$ (126), and are thus members of the same serializer. Further, $S_{id}$ (126) is the serializer for object A (124) in FIG. 1. Those skilled in the art will appreciate that one serializer may be responsible for multiple objects, but each object is associated with only one serializer. Those skilled in the art will also appreciate that a particular node may be a member of more than one serializer. Further, those skilled in the art will appreciate that a serializer may include only one member (i.e., one node may form a serializer).

In one embodiment of the invention, each serializer is associated with a generation number. The generation number is used to track major events in the DOS (108). In one embodiment of the invention, a major event in the DOS (108) may correspond, but is not limited to, one of the following: (i) partitioning of the DOS (108), (ii) reuniting of a partitioned DOS (108), etc. Partitioning of the DOS (108) occurs when the DOS (108) splits into two or more partitions such that each partition operates independently. Partitioning of the DOS (108) may occur, for example, when connectivity in portions of the DOS (108) is broken, the underlying network is disconnected at certain points, etc. Thus, no element in one partition may access any element in another partition. In contrast, uniting of a partitioned DOS (108) occurs when the underlying network connectivity issues are resolved and the individual partitions of the DOS (108) rejoin as part of the original internetwork (110).

Thus, when a partition or reunification of the DOS (108) occurs, the generation number is updated to reflect the changes invoked by these major events. In one embodiment of the invention, every generation (i.e., time period in which the DOS (108) does not undergo a major event) of a serializer is identified by a unique generation number. Further, multiple serializers are also identified by unique generation numbers. Thus, each serializer present in a partition during a generation is associated with a unique generation number. Further, all the VGUID objects created during the same generation are associated with the same unique generation number. In one embodiment of the invention, the generation number may be a random value based on the GUIDs of the nodes that are members of a particular serializer at a particular point in time (i.e., at the time when the generation number is derived). Because the generation number is based on the GUIDs of the nodes that form the serializer, when the DOS (108) is partitioned, each of the partitions choose a different generation number. Alternatively, in one embodiment of the invention, the generation number may be the hash of a generation-specific public key.

In one embodiment of the invention, each member of a serializer also includes a list of the GUIDs of the other members of the serializer. Using this list of GUIDs, each member of a particular serializer may communicate with one another using the internetwork (110) of the DOS (108). The members that make up the serializer may use the communication capability to vote on the order of updates for an object (i.e., the order of new VGUID objects (discussed below in FIG. 4)). Additionally, in one embodiment of the invention, each member of a particular serializer includes a share of (i.e., a portion of) a private key associated with the serializer. The private key is divided into shares in a manner that allows the complete private key to be regenerated if more than half of the shares of the private key are present. Thus, if at least half of the members of a particular serializer are functioning, an object update can be completed and signed by the serializer. In one embodiment of the invention, the private key is used to sign operations performed by the serializer. Alternatively, in one embodiment of the invention, the private key associated with the serializer may never be reconstructed. Rather, the signature operation itself is a distributed algorithm, where at least a fraction (i.e., ⅔) of the nodes in the serializer need to participate. Thus, the signature may be calculated without exposing the private key to any single entity.

Further, in one embodiment of the invention, each member of the serializer periodically publishes the possession of the serializer object using a publishing function. For example, in FIG. 1, Node 2 (114), Node 3 (122), and Node 5 (118) periodically publish possession of the serializer object $S_{id}$ (126). Thus, the serializer object is highly publicized within the DOS. In one embodiment of the invention, the publishing function may also be used to signal that a new serializer needs to be constructed in a partition when the DOS (108) splits into more than one partition (discussed below).

Similar to other elements within the DOS (108), the serializer is associated with a root node that tracks the location of the serializer object. In FIG. 1, the root node for the serializer object is Node 6 (120), where Node 6 (120) is denoted as $S_{root}$ (i.e., the root of the serializer object $S_{id}$ (126)) for purposes of illustration. In one embodiment of the invention, the root node of the serializer object includes functionality to locate at least one member of a serializer. For example, Node 6 (120) includes functionality to locate at least one member of the particular serializer identified by the serializer object $S_{id}$ (126). Once one member of the serializer is located, that member is capable of communicating with the other members of the serializer.

Figure 3:
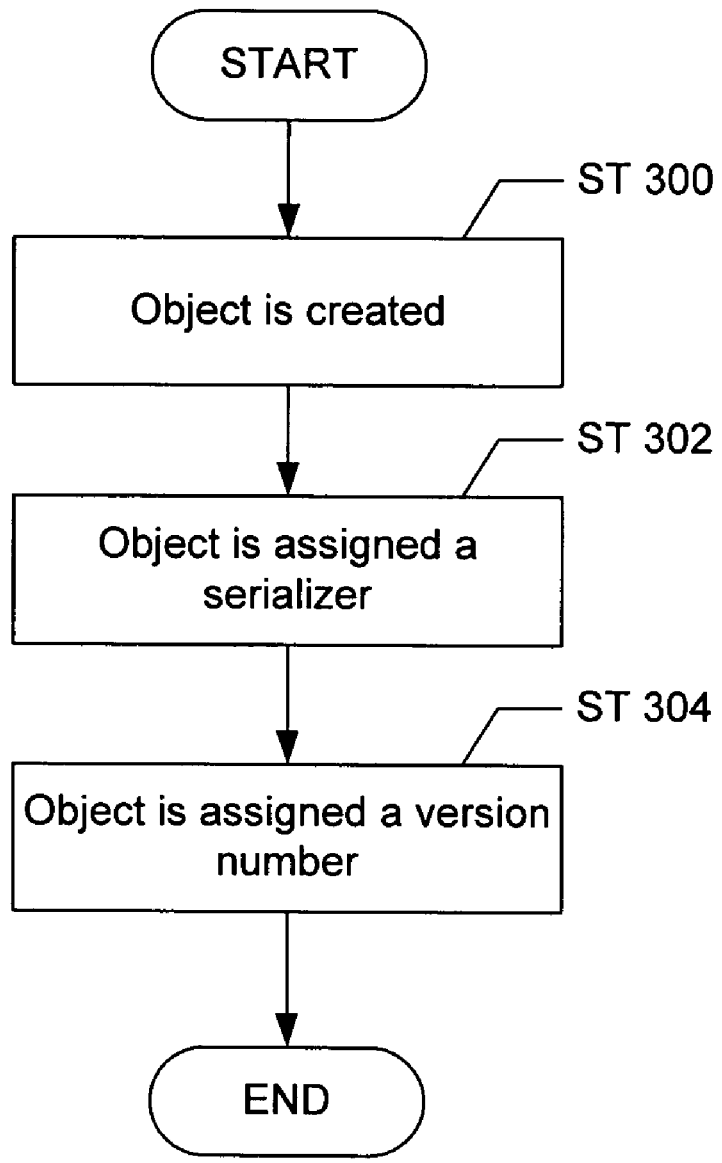
FIG. 3 shows a flow chart for creating an object in accordance with one embodiment of the invention.

FIG. 3 shows a flow chart for creating an object in accordance with one embodiment of the invention. Initially, an object is created when a client requests some data to be stored in the DOS (Step 300). Specifically, the creation of an object includes the creation of an AGUID object that contains the GUID of the object, and one VGUID object that contains the data to be stored. Subsequently, the object is assigned a serializer (Step 302). As noted above, the GUID of the serializer object is stored in the AGUID object. Additionally, when the VGUID object is created, the VGUID object is associated with a version number based on some convention (Step 304). For example, the DOS may use the convention that the first version number is one. Those skilled in the art will appreciate that other conventions to assign the first version of a newly created object may be used as well.

Figure 4:
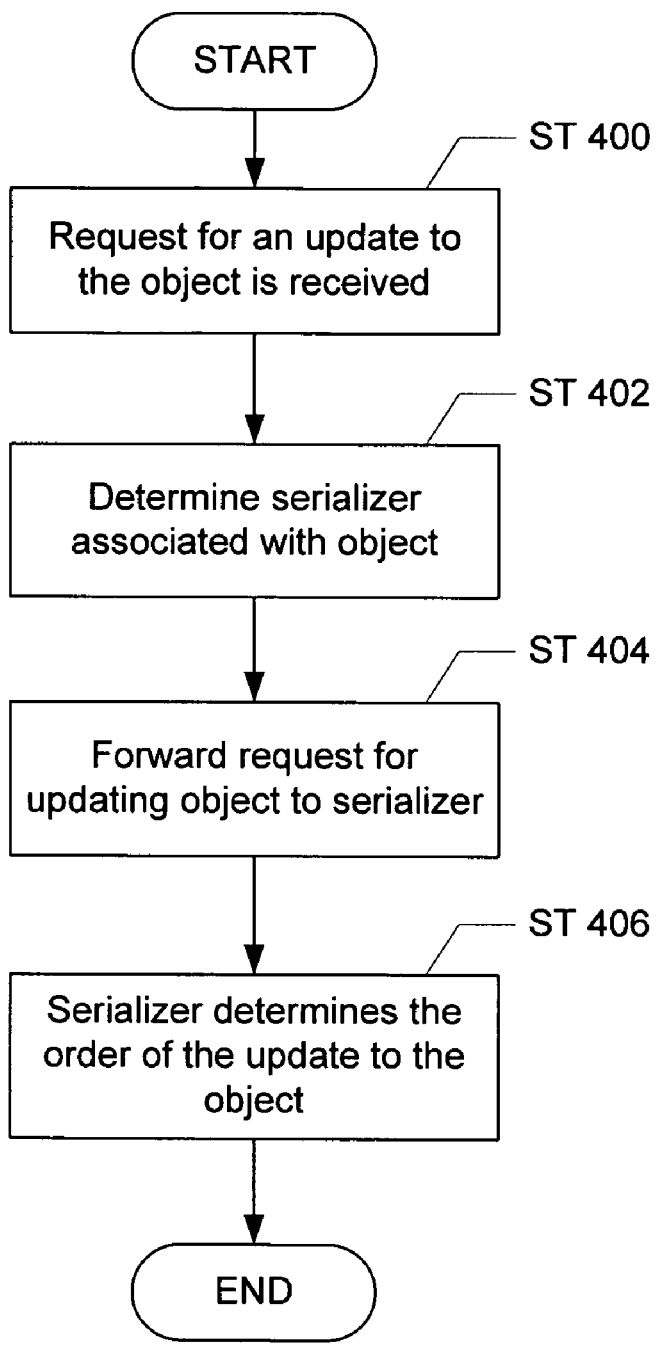
FIG. 4 shows a flow chart for updating an object in accordance with one embodiment of the invention.

FIG. 4 shows a flow chart for updating an object in accordance with one embodiment of the invention. Initially, a request to update an object is received from a client using the DOS (Step 400). In one embodiment of the invention, the update request may include the AGUID object (or a pointer to the AGUID object) associated with the object to be updated, a signature of the client, and the data required to update the object. As noted above, the AGUID object includes the GUID of a corresponding serializer object. Using this information, the node that receives the request to update the object determines which serializer is responsible for the object (Step 402) and forwards the request for an update to the object to the corresponding serializer (Step 404). In one embodiment of the invention, the node forwards both the GUID of the object and a VGUID object template to the serializer. Specifically, the node receiving the update request generates the VGUID object template, completes part of the VGUID object template corresponding to the data given by the client (i.e., pointers to the update data, the node's signature, etc.), and forwards the partially completed VGUID object template to the serializer object (i.e., using the GUID of the serializer object). In one embodiment of the invention, the GUID of the serializer object is used as the destination address of the message (i.e., update request) sent by the node. The message is navigated through the DOS and is deflected toward the first member of the serializer that is encountered. Upon receiving the message, the serializer subsequently determines the order of the update to the object (Step 406), completes the remaining areas of the VGUID object template, and forwards the VGUID object template back to the node that sent the message. In one embodiment of the invention, the node that sends the message to the serializer is responsible for storing the new VGUID object (i.e., committing the object to memory) in the DOS once the order of the update is determined by the serializer.

In one embodiment of the invention, the serializer determines the order of updates for an object by having each member of the serializer vote on the order of updates made to an object. For example, if several updates are made to an object within the same time span, then the serializer must determine in which order the object is updated. In one embodiment of the invention, the voting is resolved using a Byzantine Agreement (See, *Cyclopedia Cryptologia*, "Byzantine Agreement," Ray Dillinger (2001-2003)). Further, when the order of updates is agreed upon by the members of the serializer, the serializer populates the VGUID object template(s) provided with the object to be updated based on the order. More specifically, the VGUID object template is populated with the new version number, the generation number, etc. Subsequently, the VGUID object is added to the object chain (i.e., the VGUID object is linked to the previous VGUID object that represented the previous version of the object). Upon linking the latest VGUID object to the previous latest VGUID object, in one embodiment of the invention, the populated VGUID object template is digitally signed by the serializer. The AGUID object is then modified to reference the new VGUID object, and the modified AGUID object is stored by the serializer. The serializer then sends the updated object back to the node that sent the request for a new version of the object.

Further, although not shown in FIG. 4, in one embodiment of the invention, the node that receives the request to update the object stores the updated object using erasure coding. Erasure coding involves storing multiple copies of the updated object, where the updated object is fragmented into m fragments, and recoded into n fragments, with n being larger than m. Using erasure coding, the updated object can be reconstructed with any m fragments. In one embodiment of the invention, the ratio of m/n used to store the updated object is 16/64. Thus, the updated object is fragmented into 16 fragments, and then recoded into 64 fragments. These 64 fragments are subsequently stored by the node on various other nodes within the DOS. Thus, the object may be reconstructed using any 16 of the 64 fragments that are stored in the DOS. This method is used to ensure reliability of data so that when the DOS partitions, at least one copy of the object may be reconstructed in any partition. Those skilled in the art will appreciate that other methods may be used to store multiple copies of the update object, e.g., the DOS may simply store n copies of the updated object.

In one embodiment of the invention, multiple copies of the latest VGUID object are stored in the DOS, and each copy that is stored points to the previous VGUID objects associated with the object. However, copy-on-write allows the previous copies of the old object chain (i.e., the previous chain of VGUID objects that represented the object before the latest update) to remain the same (i.e., previous copies of the old object chain are not updated with the latest version of the object).

Figure 5:
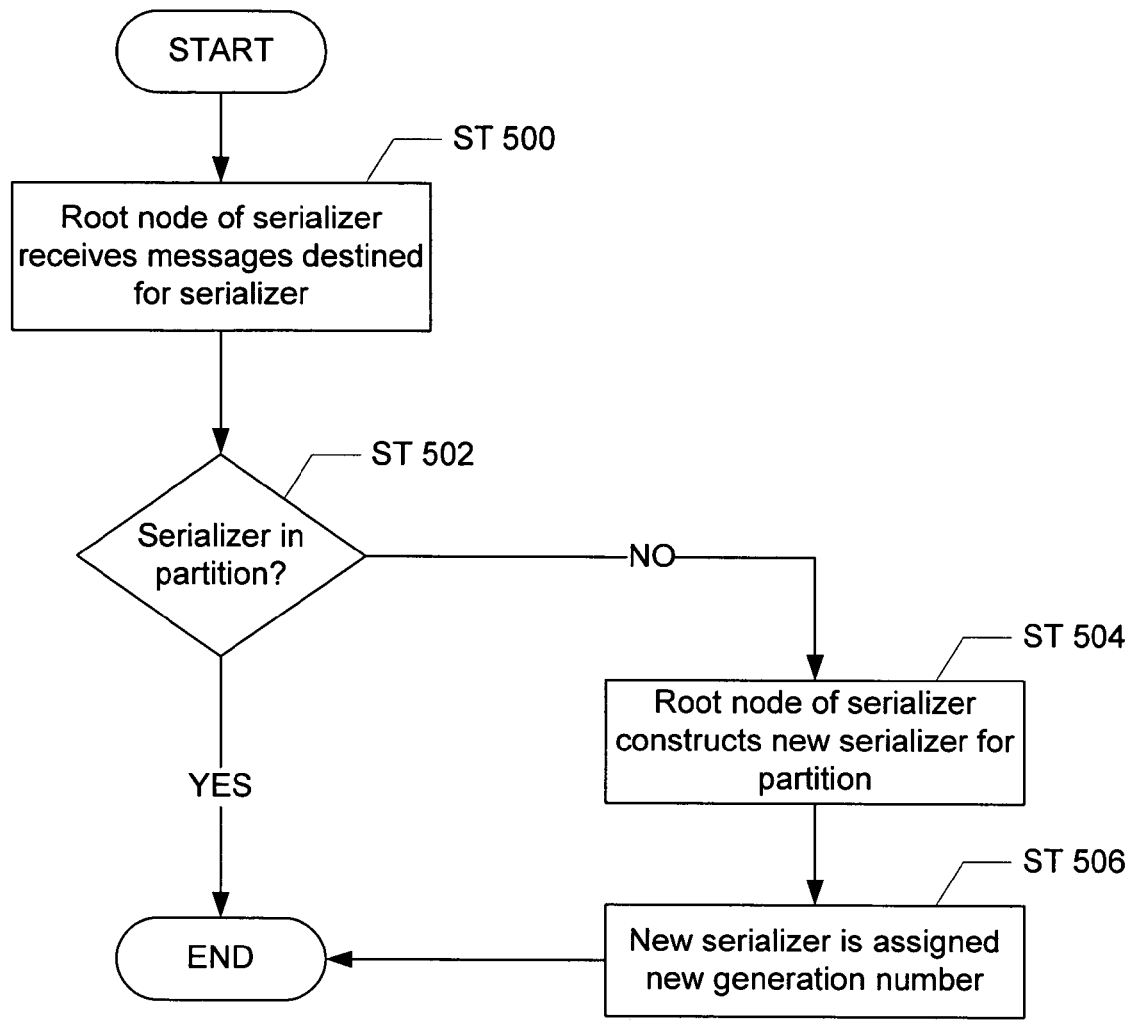
FIG. 5 shows a flow chart for managing independent object evolution in accordance with one embodiment of the invention.

FIG. 5 shows a flow chart for managing independent object evolutions when the DOS is partitioned in accordance with one embodiment of the invention. Initially, if there is no serializer in a partition, the root node of the serializer object receives messages destined for the serializer (Step 500). In one embodiment of the invention, the root of the serializer is capable of recognizing a partition in the DOS. When a message is forwarded by a node to the serializer, and the serializer cannot be located (i.e., the message is not deflected to a member of the serializer), the message eventually reaches the root node of the serializer, which is responsible for locating the serializer. Therefore, when a partition occurs in the DOS, and an update request for an object is sent to the object's serializer, the message reaches the root of the serializer object (i.e., the root of the serializer GUID). At this stage, the root of the serializer attempts to locate the serializer in the partition. If the serializer is found in the partition (Step 502), then the order of the new VGUID object is determined and the object is updated as described and shown above in FIG. 4. In one embodiment of the invention, in order to determine whether the serializer exists in the partition, two-thirds of the nodes that include the serializer object must be located in the partition. Alternatively, if less than two-thirds of the nodes that are members of the serializer reside in the partition, then the serializer does not exist in the partition. Those skilled in the art will appreciate that determining whether the serializer exists in the partition may require any number of members of the serializer to exist in the partition. For example, half of the nodes that are members of a serializer may be required to reside in the partition, or only one member of the serializer may be required to reside in the partition.

If the serializer is not found in the partition (Step 502), then the root of the serializer constructs a new serializer for the partition (Step 504). In one embodiment of the invention, the new serializer is constructed with the same GUID (i.e., the serializer object name is the same as the previous serializer); however, the members of the serializer (i.e., the nodes that include the serializer object) may be different. In one embodiment of the invention, the root of the serializer locates at least one member of the old serializer in the partition, and that member may be used to initiate the inclusion of other nodes to form the serializer with new members. Further, the member of the serializer used to acquire new members contains the serializer object, which is subsequently copied to the new members of the serializer. Because the serializer object is highly publicized, at least one copy of the serializer object is found in each partition of the DOS.

Continuing with FIG. 5, in one embodiment of the invention, the new serializer is assigned a new generation number to track that the serializer is operating after a major event in the DOS (i.e., the partitioning of the DOS) (Step 506). At this stage, the new serializer determines the order of the new VGUID object (where the new VGUID object also includes the new generation number) as described with respect to FIG. 4. Those skilled in the art will appreciate that when the DOS partitions, a copy of the object exists in each partition because when the object is stored, multiple copies of the object are also stored on various nodes within the DOS.

Figure 6:
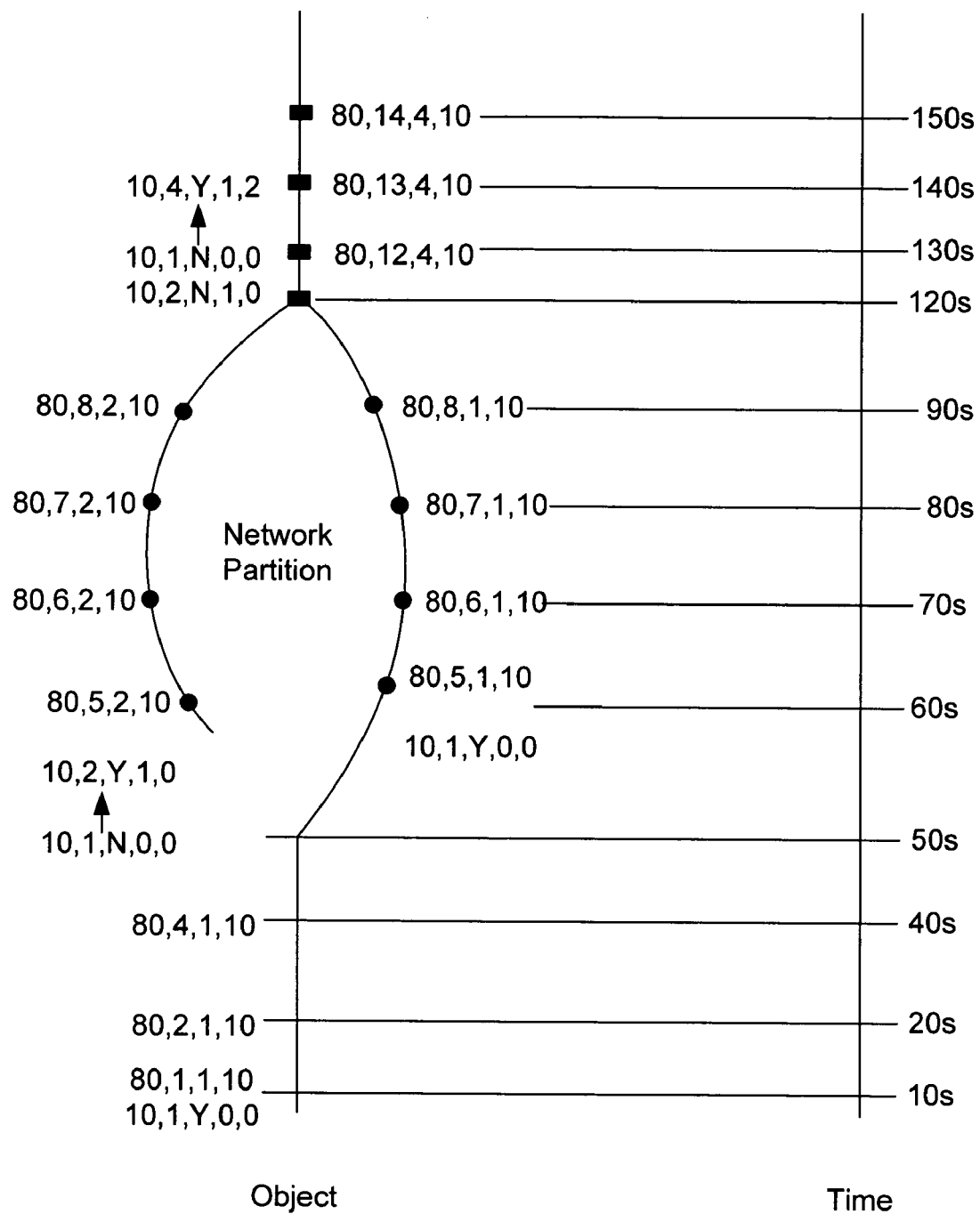
FIG. 6 shows an example of managing independent object evolution in accordance with one embodiment of the invention.

FIG. 6 shows an example of managing independent object evolutions in accordance with one embodiment of the invention. Specifically, the example shown in FIG. 6 illustrates the effects of the evolution of an object caused by DOS partitioning. In this scenario, the DOS is initially intact as one entity, and subsequently separates into two individual partitions. Upon partitioning of the DOS, the two individual evolutions of an object are shown.

Initially, at time 10s (i.e., ten seconds), object 80 is created and assigned serializer 10. Object 80 (i.e., [80,1,1,10]) is identified with information such as the object GUID (i.e., 80), the version number (i.e., 1), the generation number (i.e., 1), and the serializer GUID (i.e., 10). For purposes of this example, this information is organized into a tuple that is used to identify object 80. Similarly, serializer 10 (i.e., [10,1,Y,0,0]) is identified by the tuple that includes the serializer GUID (i.e., 10), the generation number (i.e., 1), a current value that indicates whether this serializer is the latest known version (i.e., Y), and two previous pointers that point to the previous generations that the serializer follows. Initially, the previous pointers are zero.

Continuing with FIG. 6, at time 20s, the order of the update to object 80 (i.e., [80,2,1,10]) is determined and a new version number is assigned (version 2). Again, at time 40s, object 80 (i.e., [80,4,1,10]) is updated by the serializer and assigned version number 4. At time 50s, the DOS is partitioned, and two evolutions of object 80 (i.e., [80,5,1,10] and [80,5,2,10]) must be maintained. When the partition occurs, serializer 10 is intact in the right partition. In other words, two-thirds of the members of serializer 10 remain in the right partition of the DOS. Thus, the generation number for serializer 10 in the right partition remains the same (i.e., [10,1,Y,0,0]). The left partition subsequently realizes that no serializer 10 exists, and thus the root object of the serializer creates a new serializer 10 (i.e., [10,2,Y,1,0]) with a different generation number (i.e., generation number 2). In one embodiment of the invention, when the new serializer 10 is created, the serializer object is updated to contain the GUIDs of the new members (i.e., nodes) of the new serializer 10. Note that serializer 10 with generation number 2 points to the previous serializer 10 (with generation number 1) using the previous pointer. Subsequently, at times 60s, 70s, 80s, and 90s, object 80 is updated in both the right partition and the left partition as shown in FIG. 6. Further, consider the scenario in which the same version number is assigned to updates to object 80 in different partitions. In this case, the different generation numbers distinguish the evolution of object 80 in each partition. As noted above, the same version number may be assigned to different VGUID objects associated with an object, but each of the VGUID objects added to different evolutions of an object is identified by a unique generation number.

When the partitions reunite at time 120*s*, the two separate serializer objects are united, and a new generation number is assigned to serializer 10. As shown in FIG. 6, both the individual serializer 10 objects are united into one serializer (i.e., [10,4,Y,1,2]) that is assigned generation number 4. Those skilled in the art will appreciate that generation number 1 or 2 may be reused for the united serializer. The serializer with generation number 4 references both serializer 10 with generation number 1 and serializer 10 with generation number 2. Additionally, the VGUID object(s) of object 80 (i.e., [80,12,4,10]) are updated to reflect the new generation number of corresponding serializer 10. Subsequently, at times 130*s*, 140*s*, and 150*s* object 80 is updated and assigned new version numbers 12, 13, and 14, respectively. As a result of the process illustrated in the previous example, when the DOS partitions, each partition is capable of maintaining an independent evolution of an object in the partition, and this process is maintained transparently from clients of the DOS.

Figure 7:
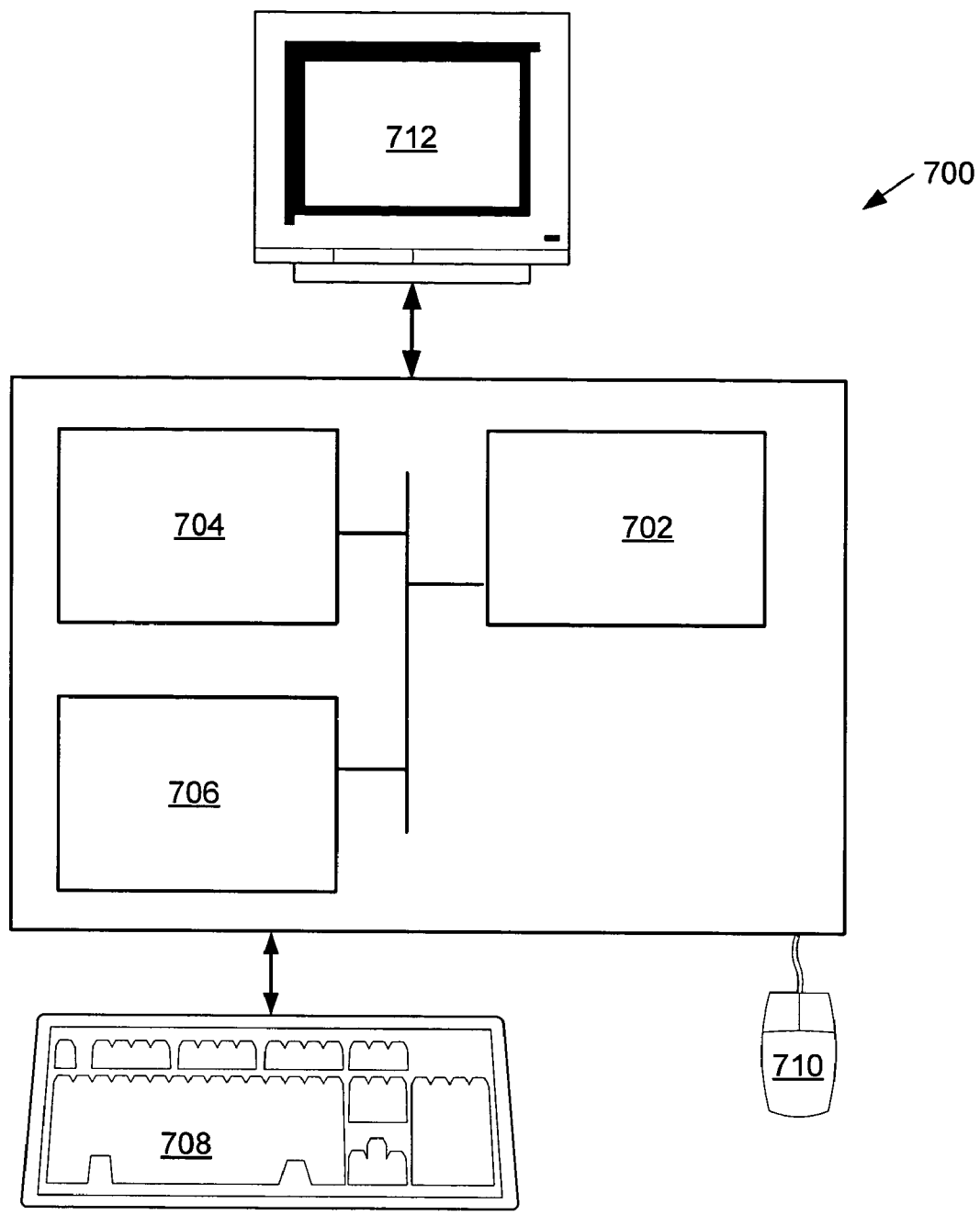
FIG. 7 shows a computer system in accordance with one embodiment of the invention.

One or more embodiments of the invention may be implemented on virtually any type of computer regardless of the platform being used. For example, as shown in FIG. 7, a networked computer system (700) includes a processor (702), associated memory (704), a storage device (706), and numerous other elements and functionalities typical of today's computers (not shown). The networked computer (700) may also include input means, such as a keyboard (708) and a mouse (710), and output means, such as a monitor (712). The networked computer system (700) is connected to a local area network (LAN) or a wide area network via a network interface connection (not shown). Those skilled in the art will appreciate that these input and output means may take other forms. Further, those skilled in the art will appreciate that one or more elements of the aforementioned computer (700) may be located at a remote location and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing object evolution in a distributed object store (DOS) comprising:
   requesting an update of an object, wherein the object comprises an active globally unique identifier (AGUID) object and at least one version globally unique identifier (VGUID) object,
      wherein the at least one VGUID object comprises a first generation number and a first serializer name,
      wherein the first generation number is updated at an occurrence of a partition of the DOS, and
      wherein the first generation number is updated at an occurrence of a reunification of the DOS;
   locating a first serializer using the first serializer name,
      wherein the first serializer is a function comprising a plurality of nodes, wherein each of the plurality of nodes comprises a serializer object,
      wherein the first serializer is responsible for ordering updates made to the object, and
      wherein the first serializer is associated with the first generation number;
   obtaining an order of the update using the first serializer; and
   creating a new VGUID object,
      wherein the new VGUID object comprises a new version number, the first generation number, and the first serializer name, and
      wherein the new VGUID object comprises a first back pointer referencing a previous VGUID object, and a second back pointer referencing a VGUID object which the new VGUID object updates.

2. The method of claim 1, further comprising:
   updating the AGUID object to reference the new VGUID object.

3. The method of claim 2, further comprising:
   creating a plurality of copies of the new VGUID object; and
   storing each of the plurality of copies of the new VGUID object on one of a plurality of nodes in the DOS.

4. The method of claim 1, wherein requesting the update of the object comprises generating a VGUID template.

5. The method of claim 1, wherein the serializer object comprises the first generation number and a globally unique identifier (GUID) for each of the plurality of nodes.

6. The method of claim 1, wherein locating the first serializer comprises sending the request for the update of the object to a root node of the first serializer, wherein the root node of the first serializer is configured to find at least one of the plurality of nodes.

7. The method of claim 1, wherein obtaining the order of the update of the object comprises voting on the order of the update by each of the plurality of nodes.

8. The method of claim 1, wherein the first serializer comprises a reference to a previous generation of the first serializer, wherein the previous generation is identified by a previous generation number.

9. The method of claim 1, wherein the DOS is partitioned into a first partition and a second partition.

10. The method of claim 9, further comprising:
   determining whether the first serializer associated with the object is located in the first partition;
   if the object is located in the first partition and the first serializer is located in the second partition:
      creating a second serializer in the first partition using at least one of a plurality of serializer objects associated with the first serializer, wherein the at least one of the plurality of serializer objects is located in the first partition;
      assigning a second generation number to the second serializer;
      creating the new VGUID object using the second serializer; and
   creating the new VGUID object using the first serializer, if the object is located in the first partition and the first serializer is located in the first partition.

11. The method of claim 10, wherein determining whether the first serializer is located in the first partition comprises determining whether two-thirds of a plurality of nodes comprising the serializer object associated with the first serializer are located in the first partition.

12. A computer system, comprising:
   a processor;
   a memory comprising a distributed object store (DOS);
   an object stored in the DOS comprising an AGUID object and at least one VGUID object, wherein the object is configured to be updated with a new VGUID object;
   a plurality of nodes configured to store the object; and
   a first serializer configured to determine an order of the new VGUID object, wherein the first serializer is a function comprising a plurality of nodes, wherein each of the plurality of nodes comprises a serializer object, wherein the first serializer is responsible for ordering updates made to the object, wherein the first serializer is associated with a first generation number, wherein the first generation number is updated at an occurrence of a partition of the DOS, wherein the first generation number is updated at an occurrence of a reunification of the DOS, wherein the new VGUID object comprises the first generation number, and wherein the new VGUID object comprises a first back pointer referencing a previous VGUID object, and a second back pointer referencing a VGUID object which the new VGUID object updates.

13. The system of claim 12, further comprising:
a client configured to send a request for an update to the object.

14. The system of claim 13, wherein the request comprises a VGUID template.

15. The system of claim 12, wherein the first serializer is configured to populate the VGUID template with the new version number.

16. The system of claim 12, wherein the serializer object comprises the first generation number and a globally unique identifier (GUID) for the at least one of the plurality of nodes.

17. The system of claim 12, wherein the first serializer is further configured to update the AGUID object to reference the new VGUID object.

18. The system of claim 12, wherein one of the plurality of nodes is a root node of the object configured to locate the object, and wherein one of the plurality of nodes is a first root node of the first serializer configured to locate the first serializer.

19. The system of claim 12, wherein the first serializer comprises a reference to a previous generation of the first serializer, wherein the previous generation is identified by a previous generation number.

20. The system of claim 12, wherein the plurality of nodes is partitioned into a first partition and a second partition.

21. The system of claim 20, further comprising:
a second serializer located in the first partition configured to assign the new version number to the new VGUID object, wherein the object is located in the first partition and the first serializer is located in the second partition, wherein the second serializer is created using at least one of a plurality of serializer objects associated with the first serializer, and wherein the at least one of the plurality of serializer objects is located in the first partition.

22. The system of claim 21, wherein the second serializer is associated with a second generation number.

23. The system of claim 21, wherein new VGUID object comprises the second generation number.

24. A computer readable storage medium for managing object evolution in a distributed object store (DOS) comprising software instructions to:

request an update of an object, wherein the object comprises an active globally unique identifier (AGUID) object and at least one version globally unique identifier (VGUID) object, wherein the least one VGUID object comprises a first generation number and a first serializer name, wherein the first generation number is updated at an occurrence of a partition of the DOS, and wherein the first generation number is updated at an occurrence of a reunification of the DOS;

locate a first serializer using the first serializer name,
wherein the first serializer is a function comprising a plurality of nodes, wherein each of the plurality of nodes comprises a serializer object, wherein the first serializer is responsible for ordering updates made to the object, and wherein the first serializer is associated with the first generation number;

obtain an order of the update using the first serializer; and create a new VGUID object, wherein the new VGUID object comprises a new version number, the first generation number, and the first serializer name, wherein the new VGUID object comprises a first back pointer referencing a previous VGUID object, and a second back pointer referencing a VGUID object which the new VGUID object updates.

* * * * *